US 6,584,517 B1

(12) United States Patent
Raza

(10) Patent No.: US 6,584,517 B1
(45) Date of Patent: Jun. 24, 2003

(54) CIRCUIT AND METHOD FOR SUPPORTING MULTICAST/BROADCAST OPERATIONS IN MULTI-QUEUE STORAGE DEVICES

(75) Inventor: S. Babar Raza, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/347,046

(22) Filed: Jul. 2, 1999

(51) Int. Cl.[7] .............................................. G06F 3/00
(52) U.S. Cl. .......................... 710/52; 710/33; 370/230
(58) Field of Search ............................ 710/31, 33, 52; 370/230, 438

(56) References Cited

U.S. PATENT DOCUMENTS

| | | | |
|---|---|---|---|
| 4,956,839 A | 9/1990 | Torii et al. ...................... 370/60 |
| 5,101,404 A | 3/1992 | Kunimoto et al. ............. 370/60 |
| 5,247,671 A | 9/1993 | Adkins et al. ............... 395/650 |
| 5,251,206 A | 10/1993 | Calvignac et al. .......... 370/60.1 |
| 5,280,591 A | 1/1994 | Garcia et al. ................ 395/325 |
| 5,313,591 A | 5/1994 | Averill ........................ 395/325 |
| 5,319,754 A | 6/1994 | Meinecke et al. ........... 395/325 |
| 5,321,691 A | 6/1994 | Pashan ........................ 370/58.3 |
| RE34,896 E | 4/1995 | Calvignac et al. ............. 370/84 |
| 5,408,469 A | 4/1995 | Opher et al. ................ 370/60.1 |
| 5,418,781 A | 5/1995 | Kaufman et al. .............. 370/60 |
| 5,436,893 A | 7/1995 | Barnett ...................... 370/60.1 |
| 5,438,681 A | 8/1995 | Mensch, Jr. .................. 395/800 |
| 5,440,549 A | 8/1995 | Min et al. ...................... 370/60 |
| 5,440,698 A | 8/1995 | Sindhu et al. .......... 395/200.08 |
| 5,450,398 A | 9/1995 | Abefelt et al. .............. 370/60.1 |
| 5,452,259 A | 9/1995 | McLaury ................ 365/230.05 |
| 5,459,840 A | 10/1995 | Isfeld et al. ................. 395/309 |
| 5,469,545 A | 11/1995 | Vanbuskirk et al. ... 395/200.01 |
| 5,487,170 A | 1/1996 | Bass et al. ................... 395/732 |
| 5,499,239 A | 3/1996 | Munter ....................... 370/60.1 |
| 5,504,741 A | 4/1996 | Yamanaka et al. ......... 370/58.2 |
| 5,537,400 A | 7/1996 | Diaz et al. .................. 370/58.2 |
| 5,577,032 A | 11/1996 | Sone et al. ................. 370/58.3 |
| 5,577,035 A | 11/1996 | Hayter et al. .................. 370/60 |
| 5,579,278 A | 11/1996 | McLaury ............... 365/230.05 |
| 5,581,713 A | 12/1996 | Myers et al. ................ 395/299 |
| 5,583,858 A | 12/1996 | Hanaoka ..................... 370/392 |
| 5,617,367 A | 4/1997 | Holland et al. ............. 365/219 |
| 5,634,074 A | 5/1997 | Devon et al. ................ 395/828 |
| 5,654,968 A | 8/1997 | Smiroldo .................... 370/443 |
| 5,668,807 A | 9/1997 | Schachar et al. ............ 370/378 |
| 5,673,132 A | 9/1997 | Carbone, Jr. et al. ....... 359/177 |
| 5,724,351 A | 3/1998 | Chao et al. ................. 370/395 |
| 5,724,358 A | 3/1998 | Headrick et al. ........... 370/418 |
| 5,787,095 A | 7/1998 | Myers et al. ............... 371/68.1 |
| 5,790,539 A | 8/1998 | Chao et al. ................. 370/390 |
| 5,793,764 A | 8/1998 | Bartoldus et al. ........... 370/395 |
| 5,799,014 A | 8/1998 | Kozaki et al. .............. 370/358 |
| 5,802,052 A | 9/1998 | Venkataraman ............. 370/395 |
| 5,835,498 A | 11/1998 | Kim et al. ................... 370/537 |
| 5,844,887 A | 12/1998 | Oren et al. .................. 370/218 |
| 5,850,395 A | 12/1998 | Hauser et al. .............. 370/398 |
| 5,852,606 A | 12/1998 | Prince et al. ................ 370/393 |
| 5,875,190 A | 2/1999 | Law ........................... 370/395 |
| 5,912,889 A | 6/1999 | Preas et al. ................. 370/359 |
| 5,991,295 A | 11/1999 | Tout et al. ................... 370/376 |
| 6,067,300 A * | 5/2000 | Baumert et al. ............ 370/235 |
| 6,215,769 B1 * | 4/2001 | Ghani et al. ................ 370/230 |
| 6,246,682 B1 | 6/2001 | Roy et al. ................... 370/390 |
| 6,246,692 B1 * | 6/2001 | Dai et al. .................... 370/438 |
| 6,295,295 B1 | 9/2001 | Wicklund ................... 370/392 |
| 6,339,596 B1 | 1/2002 | Kozaki et al. .............. 370/395 |

* cited by examiner

Primary Examiner—Jeffrey Gaffin
Assistant Examiner—Harold Kim
(74) Attorney, Agent, or Firm—Christopher P. Maiorana, P.C.

(57) ABSTRACT

A circuit comprising a memory and a control circuit. The memory may be configured to (i) hold one or more packets of information and (ii) send the held packets of information in response to one or more control signals. The control circuit may be configured to generate the one or more control signals.

22 Claims, 8 Drawing Sheets

US 6,584,517 B1

CIRCUIT AND METHOD FOR SUPPORTING MULTICAST/BROADCAST OPERATIONS IN MULTI-QUEUE STORAGE DEVICES

This application may relate to co-pending U.S. patent application Ser. No. 09/347,830, filed Jul. 2, 1999, and U.S. patent application Ser. No. 09/347,045, filed Jul. 2, 1999, which are each hereby incorporated by reference in their entirety.

FIELD OF THE INVENTION

The present invention relates to multi-queue storage devices generally and, more particularly, to a circuit and method for supporting multicast/broadcast operations in multi-queue storage devices.

BACKGROUND OF THE INVENTION

Communication devices may use storage devices to store information that is transferred between devices operating at different speeds. Such communication devices may provide multicast and broadcast functions.

Referring to FIG. 1, a block diagram of a conventional communications device 10 is shown. The communications device 10 comprises a port 12 and a switch fabric 14. The port 12 comprises a packet storage device 15, a packet classifier 16, a queue manager 18 and a scheduler 20. A number of management buses 22a–22n transfer management information between the packet classifier 16, the queue manager 18 and the scheduler 20. A number of data buses 23a–23n transfer data between the packet classifier 16, the queue manager 18 and the packet storage device 15. The management bus 22n is generally required to connect the packet classifier 16 to the scheduler 20.

SUMMARY OF THE INVENTION

The present invention concerns a circuit comprising a memory and a control circuit. The memory may be configured to (i) hold one or more packets of information and (ii) send the held packets of information in response to one or more control signals. The control circuit may be configured to generate the one or more control signals.

The objects, features and advantages of the present invention include providing a device that may (i) provide multicast operations, (ii) broadcast operations and/or (iii) independent multicast/broadcast operations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
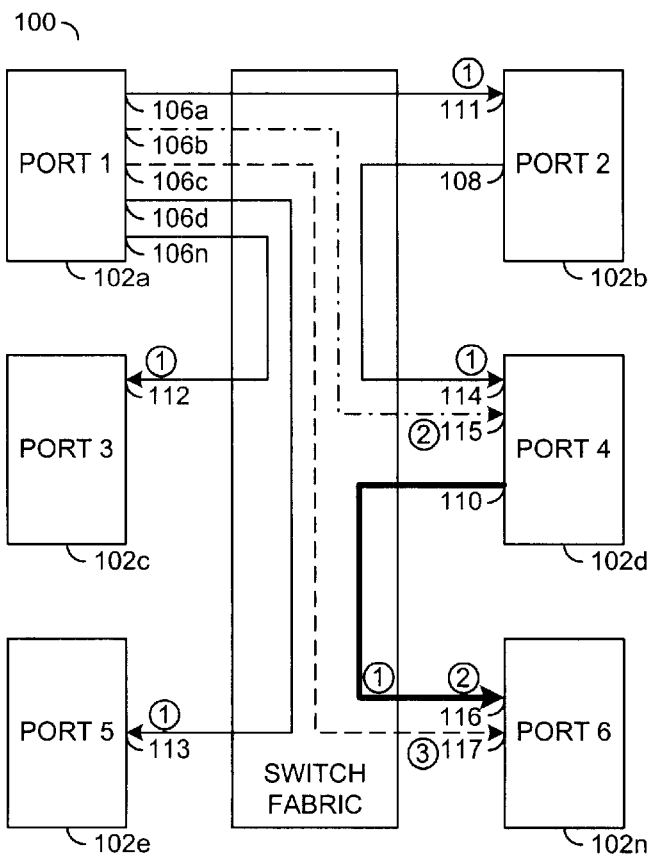
FIG. 2 is a block diagram illustrating a context of the present invention.

Referring to FIG. 2, a block diagram of a circuit 100 is shown illustrating a context of the present invention. The circuit 100 generally comprises a switch fabric 104 and a number of ports 102a–102n. The switch fabric 104 may be a conventional switch fabric or, alternatively, a switch fabric as described in copending application, Ser. No. 09/347,830, which is hereby incorporated by reference in its entirety.

Figure 1:
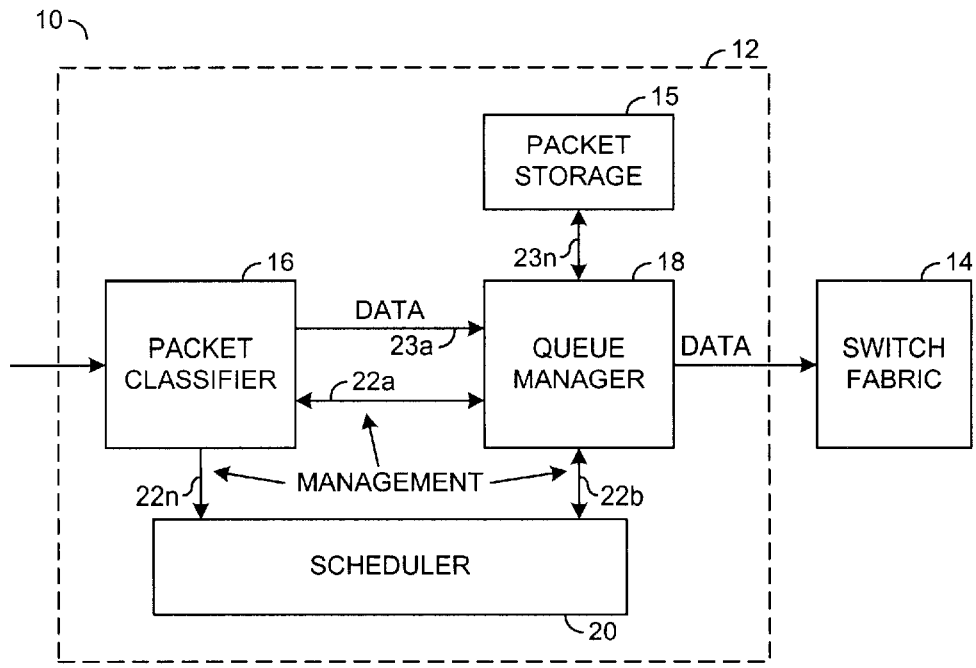
FIG. 1 is a block diagram of a conventional communications device.

The port 102a is shown having a number of transmit times 106a–106n. The port 102b is shown having a transmit time 108. The port 102b is also shown having a receive time 111. The port 102c is shown having a receive time 112. The port 102e is shown having a receive time 113. The port 102d is shown having a receive time 114, a receive time 115, and a transmit time 110. The port 102n is shown having a receive time 116 and a receive time 117. However, the examples of the particular transmit and receive times illustrated in FIG. 1 are shown as examples to illustrate multicast and broadcast features.

A multicast operation may occur when a particular port 102a–102n may have to transmit the incoming data to two or more of the ports (e.g., the transmit times 106a, 106d and 106n). A broadcast operation may occur when a particular port 102a–102n may have to transmit the data to all the other ports 102a–102n.

In FIG. 2, the port 102a is shown broadcasting (which is generally a special case of multicasting) a packet through the switch fabric 104. The number 1 in a circle at the receive times 111, 112, 113 and 114 may be a slot time 1. The receive time 115 may be a slot time 2. The receive time 117 may be a slot time 3. The receive time 116 may be both the slot time 2 and 3. The slot time may be a specified time interval for successive transmissions of data blocks. The slot time may be the time necessary to send a data block. One or more data blocks may be necessary to transmit a packet. The port 102a can send a packet to the port 102b, the port 102c and the port 102e, which are generally indicated by thin solid lines. During the slot time 1, the port 102b may also send a packet to the port 102d, which is generally also indicated by a thin solid line. Similarly, the port 102d may send a packet to the port 102n during slot time 1. In a slot time 2, the port 102d may become available for reception and the port 102a may send the same packet to the port 102d. However, the port 102d may still be sending the packet to the port 102n. Therefore, the port 102a may have to wait another slot time before sending to the port 102n. In a slot time 3, the port 102a may send the data to the final destination (e.g., the port 102n).

Even though the port 102a may send data to 3 ports in the slot time 1, the port 102a may have to hold the packet in a local memory until the packet is sent to all of the destinations. The scheduling through the switch fabric 104 may be done by a scheduler (to be described in more detail in connection with FIG. 3) based a number of predefined criteria. The scheduler may handle priorities for quality of service (QoS) and fairness to avoid starvation of a particular queue.

Figure 3:
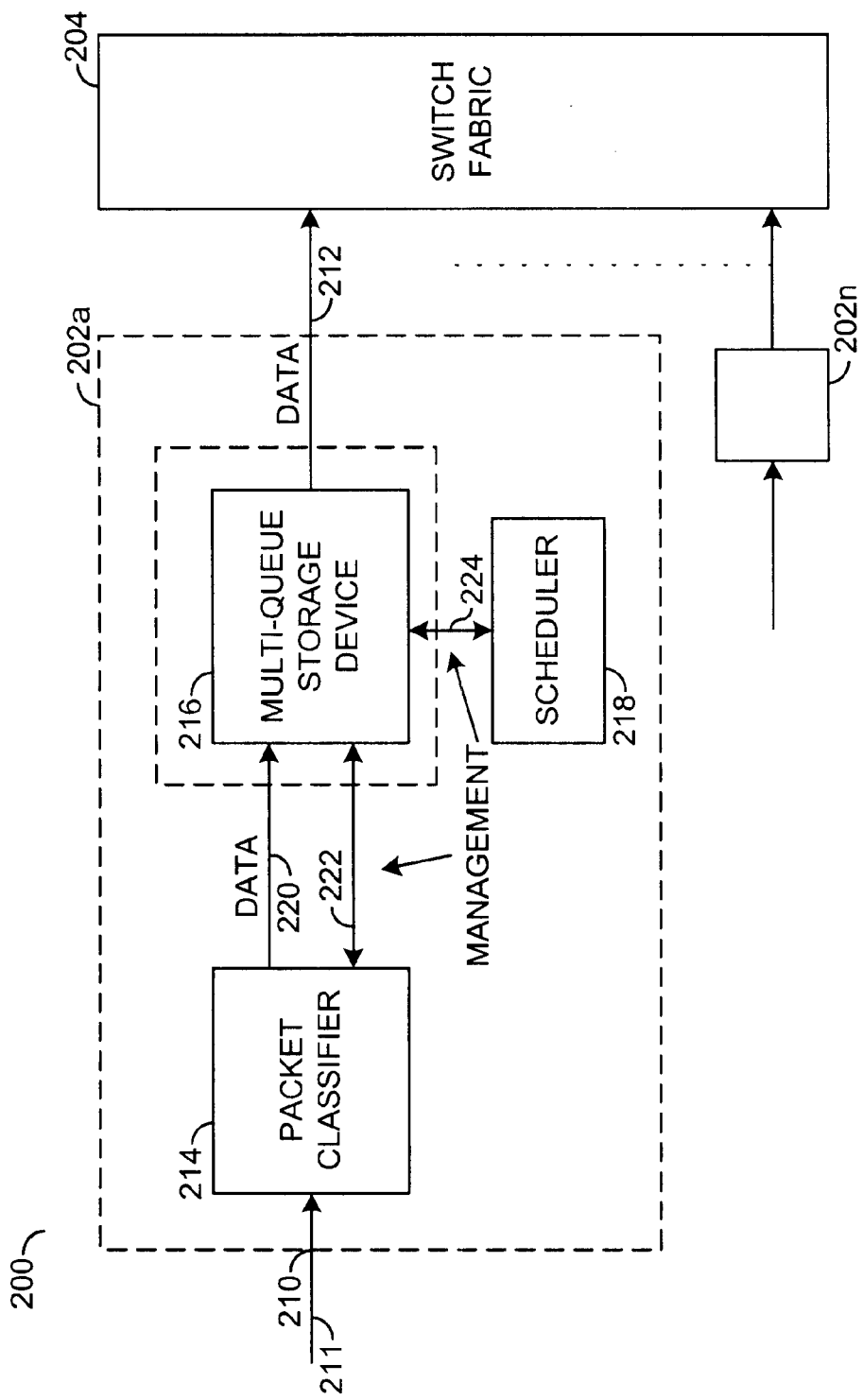
FIG. 3 is a block diagram of a preferred embodiment of the present invention.

Referring to FIG. 3, a circuit 200 is shown in accordance with the preferred embodiment of the present invention. The circuit 200 generally comprises a number of ports 202a–202n and a switch fabric 204. The port 202a generally has an input 210 that may receive information from a serial link 211 and an output 212 that generally presents information to the switch fabric 204.

The port 202a generally comprises a packet classifier 214, a multi-queue storage device 216 and a scheduler 218. The packet classifier 214 and the scheduler 218 may be considered a control circuit that may control data and management information held in the multi-queue storage device 216. The multi-queue storage device 216 may be, in one example, a first-in first-out (FIFO) memory. However, the multi-queue storage device 216 may be implemented as any appropriate memory (e.g., a random access memory (RAM) with appropriate logic).

The packet classifier 214 generally includes a data bus 220 that may present data to the multi-queue storage device 216. A management bus 222 generally provides communication between the packet classifier 214 and the multi-queue storage device 216. The data bus 220 and the management bus 222 are shown implemented as separate communication buses between the packet classifier 214 and the multi-queue storage element 216. However, in another example, the data bus 220 and the management bus 222 may be implemented as a single management and data bus that may embed the management information in the data. Such a bus may be implemented as a bi-directional bus between the packet classifier 214 and the multi-queue storage device 216. The management bus 224 generally provides communication between the multi-queue storage device 216 and the scheduler 218. In general, the packet classifier 214 and the scheduler 218 are not connected with management buses. Additionally, each of the ports 202a–202n generally comprise the components described in connection with the port 202a.

The multi-queue storage device 216 may be defined as a storage buffer and a queue manager integrated together. For a multi-queue device, the packet classifier 214 and the scheduler 218 may be external to the multi-queue storage device 216. FIG. 3 illustrates the packet classifier 214 and the scheduler 218 in such a configuration.

Figure 4:
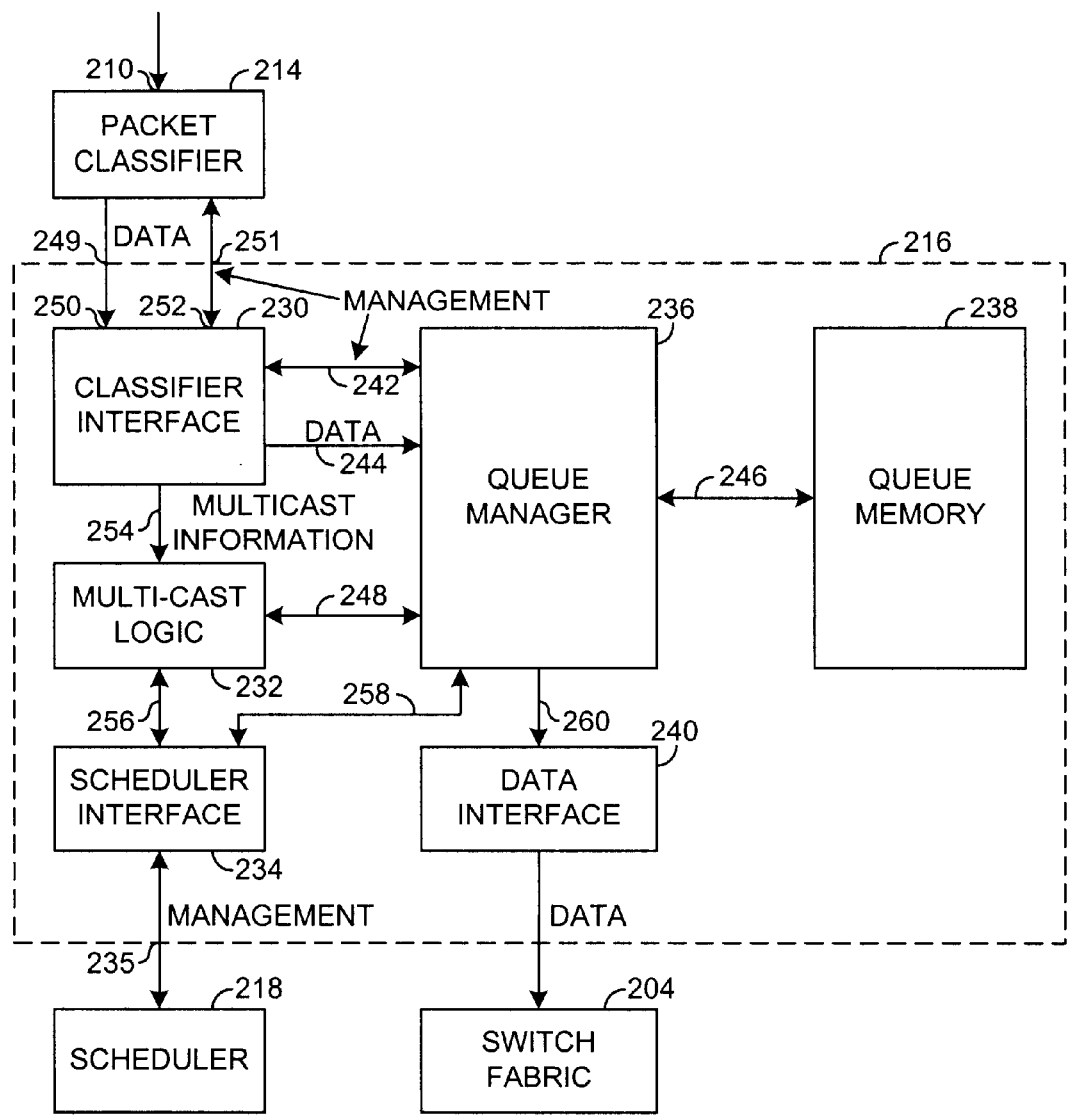
FIG. 4 is a more detailed diagram of the circuit of FIG. 3.

Referring to FIG. 4, a more detailed diagram of the multi-queue storage device 216 is shown. The multi-queue storage device 216 generally comprises a classifier interface 230, a multicast logic block (or circuit) 232, a scheduler interface 234, a queue manager 236, a queue memory 238 and a data interface 240. The classifier interface 230 generally has a management bus 242 that may communicate with the queue manager 236 and a data bus 244 that may present data to the queue manager 236. The queue manager 236 may also have a bus 246 that may communicate with the queue memory 238 and a bus 248 that generally communicates with the multicast logic 232. The classifier interface 230 generally has an input 250 that may receive data from the packet classifier 214 and an input 252 that generally receives management signals from the packet classifier 214. The classifier interface 230 generally has a bus 254 that may present information (e.g., multicast information) to the multicast logic 232. The multicast logic 232 may have a bus 256 that may present multicast information to and from the scheduler interface 234. The scheduler interface 234 may also have a bus 258 that may present and receive information to and from the queue manager 236. The queue manager 236 may present information to the data interface 240 through a bus 260.

The packet classifier 214 may communicate with the classifier interface 230 through an input 249 and an input/output 251 of the multi-queue storage device 216. The scheduler 218 may communicate with the scheduler interface 234 through an input/output 235 of the multi-queue storage device 216. Since the packet classifier 214 and the scheduler 218 are generally connected to the multi-queue storage device 216 through the input 249, the input/output 251 and the input/output 235, a direct communication between the packet classifier 214 and the scheduler 218 may not be necessary. Additionally, the packet classifier 214 and the scheduler 218 may be implemented on separate integrated circuits from the multi-queue storage device 216.

Figure 5:
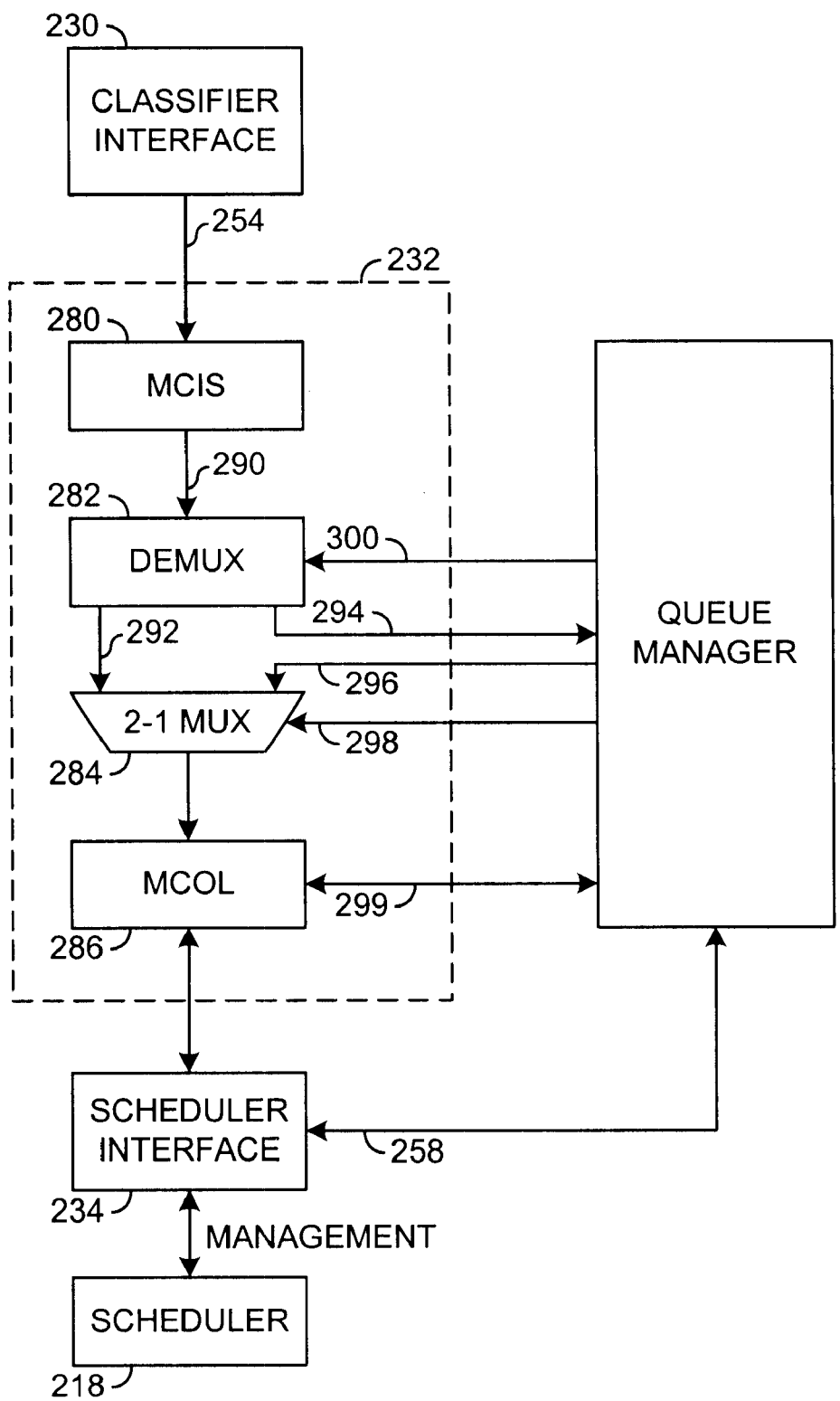
FIG. 5 is a more detailed diagram of the multicast logic.

Referring to FIG. 5, a more detailed diagram of the multicast logic 232 is shown. The multicast logic 232 generally comprises a storage device (or element) 280, a demultiplexer 282, a multiplexer 284 and a multicast output logic block (or circuit) 286. The storage element 280 may be implemented, in one example, as a multicast input storage element. The storage element 280 generally presents port information, through a bus 290, to the demultiplexer 282. The demultiplexer 282 may comprise an output bus 292 that may present port information to the multiplexer 284. The demultiplexer 282 may have a bus 294 that may be connected to the queue manager 236. The multiplexer 284 may have an input bus 296 that may receive port information from the queue manager 236. Additionally, a control bus 298 may receive information from the queue manager 236 that may control the multiplexer 284. The demultiplexer 282 may also have an input bus 300 that may receive control information from the queue manager 236. The multicast output logic circuit 286 may be connected to the queue manager 236 through a bus 299.

The multicast input storage element 280 may be implemented to increase the performance of the input interface for high speed systems. Similarly, the multicast output logic circuit 286 may be implemented to increase the performance of the output interface for high speed systems. The bus 258 may transfer information other than port information (e.g., queue status flag information, configuration, queue selection, etc.). A more detailed operation of the various components of FIG. 5 are described in more detail in connection with FIGS. 8 and 9.

Figure 6A:
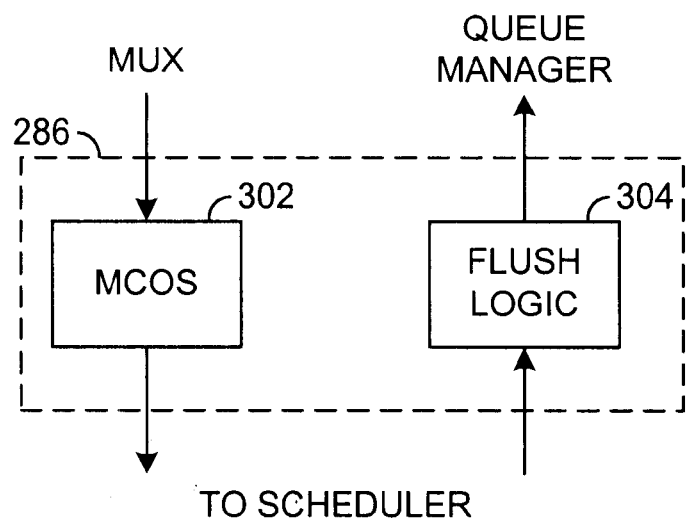
FIGS. 6A and 6B are examples of the multicast output logic.
Figure 6B:
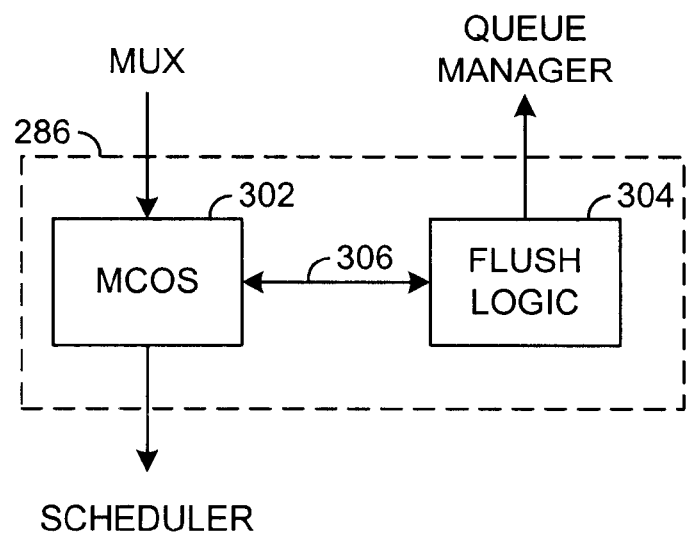

Referring to FIGS. 6A and 6B, examples of the multicast output logic 286 are shown. For example in FIG. 6A, the multicast output logic 286 is shown having a storage element 302, which may be implemented as a multicast output storage device (MCOS) and a flush logic block (or circuit) 304. The multicast output storage device 302 generally receives information from the multiplexer 284 of FIG. 5 and presents information to the scheduler interface 234 of FIG. 5. The flush logic 304 generally presents information to the queue manager 236. The multicast output storage device 302 may be written from the multiplexer 284 either for the first packet (e.g., from the demultiplexer) or during the update (e.g., from the queue manager 236). The scheduler 218 may then read information from the multicast output storage device 302 through the schedule interface 234. When the scheduler 218 is done with the packet, a flush command may be sent to the flush logic 304. The flush logic 304 may then communicate this information to the queue manager 236, which may start the update operation.

In the example in FIG. 6B, the storage element 302 is shown having a bus 306 connecting to the flush logic 304. The circuit in FIG. 6B may operate by having the scheduler 218 read the multicast output storage device 302. Every time the scheduler 218 sends out the packet to a particular port, the scheduler 218 may de-assert the particular port signal and write back to the multicast output storage device 302. When the data is sent out to all the ports (e.g., all the port signals de-asserted), the scheduler 218 may automatically send a flush command through the flush logic 304 to the queue manager 236 for an update operation.

Figure 7A:
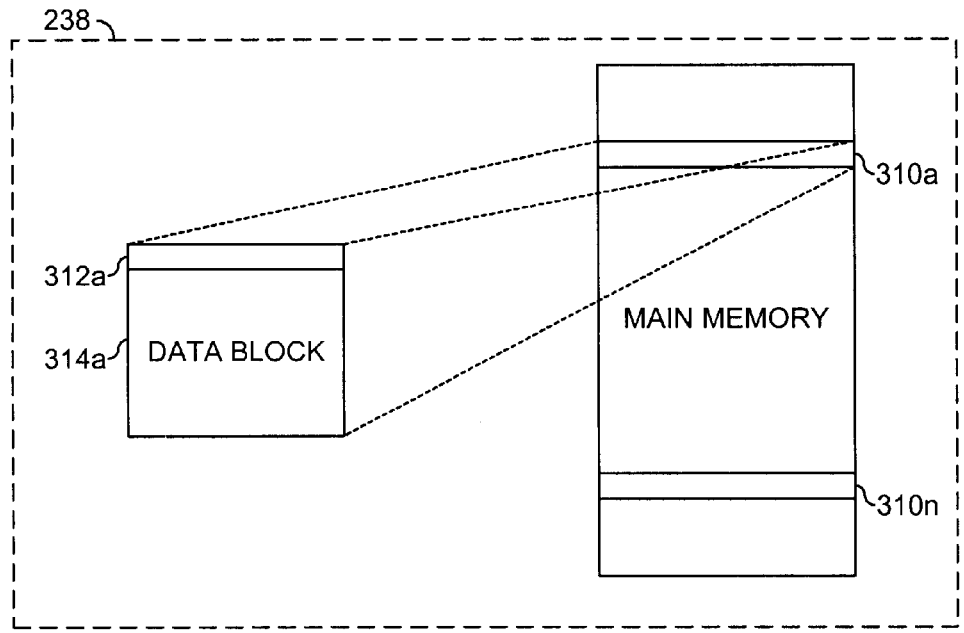
FIGS. 7A and 7B illustrate examples of the memory used in the circuit of FIG. 4.
Figure 7B:
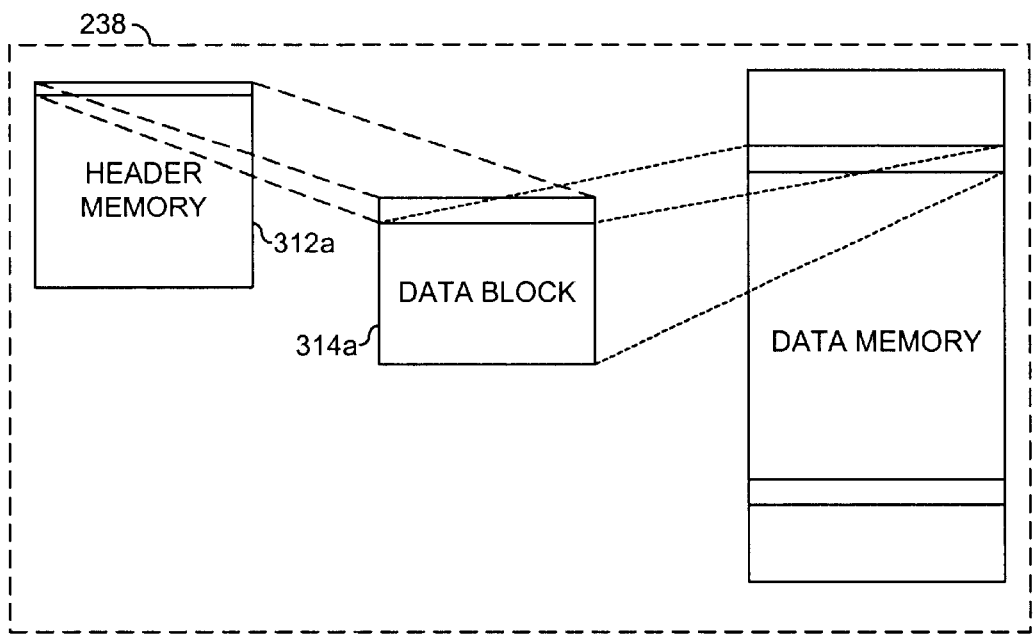

Referring to FIGS. 7A and 7B, examples of the queue memory 238 are shown. The queue memory 238 generally comprises a number of memory sections 310a–310n. Each of the memory sections 310a–310n may comprise a header section 312a–312n and a storage section 314a–314n. The memory sections 310a–310n may be implemented as a number of memory elements. The queue memory 238 may provide a number of storage queues that may be independently accessed by the queue manager 236. Additionally, the independent queues may be managed by the queue manager 236 through the header sections 312a–312n. The queue manager 236 generally presents a signal 298 (of FIG. 5) to the multiplexer 284 (of FIG. 5). Another input to the multiplexer 284 may be received directly from the demultiplexer 282. The operation of the multiplexer 284 and the demultiplexer 282 may be described in more detail in connection with FIG. 8.

In this architecture, the packet classifier 214 may communicate information about the arrival of a new multicast packet to the multicast logic 232. The packet classifier 214 may also communicate the port information indicating the list of output ports to the multicast logic 232. The storage device 280 of FIG. 5 may be, in one example, an embedded register or, in another example, may be integrated with the classifier interface 230 used by the packet classifier 214. The port information about the particular packet may be stored in a number of ways in response to the type of packet received. In one case, when the packet is not the first packet in the queue, the port information may be stored in one of the memory sections 310a–310n of the queue memory 238 along with other packet header information stored in the corresponding header section 312a–312n. In another case, when the packet is the first packet in that queue, the port information may be directly stored into the storage element 280 of FIG. 5.

The scheduler 218 generally reads the port information from the multicast output logic 232 through the bus 256 and the scheduler interface 234. Once the scheduler 218 services all the ports from the list, the scheduler 218 generally sends information to initiate a flush command to the flush logic 304. The flush command generally indicates that the multi-queue storage device 216 should release the contents of all the buffers of a specified packet. The scheduler 218 then checks whether the packet received was the last packet in the queue. If the packet is the last packet in the queue, the scheduler 218 receives this information through the bus 258. If the packet flushed was not the last packet in the queue, the queue manager 236 pulls out the port information for the next packet in the queue from the header information and places the port information into the multicast output storage device 302. The method for initiating the process is described in connection with FIG. 8.

Figure 8:
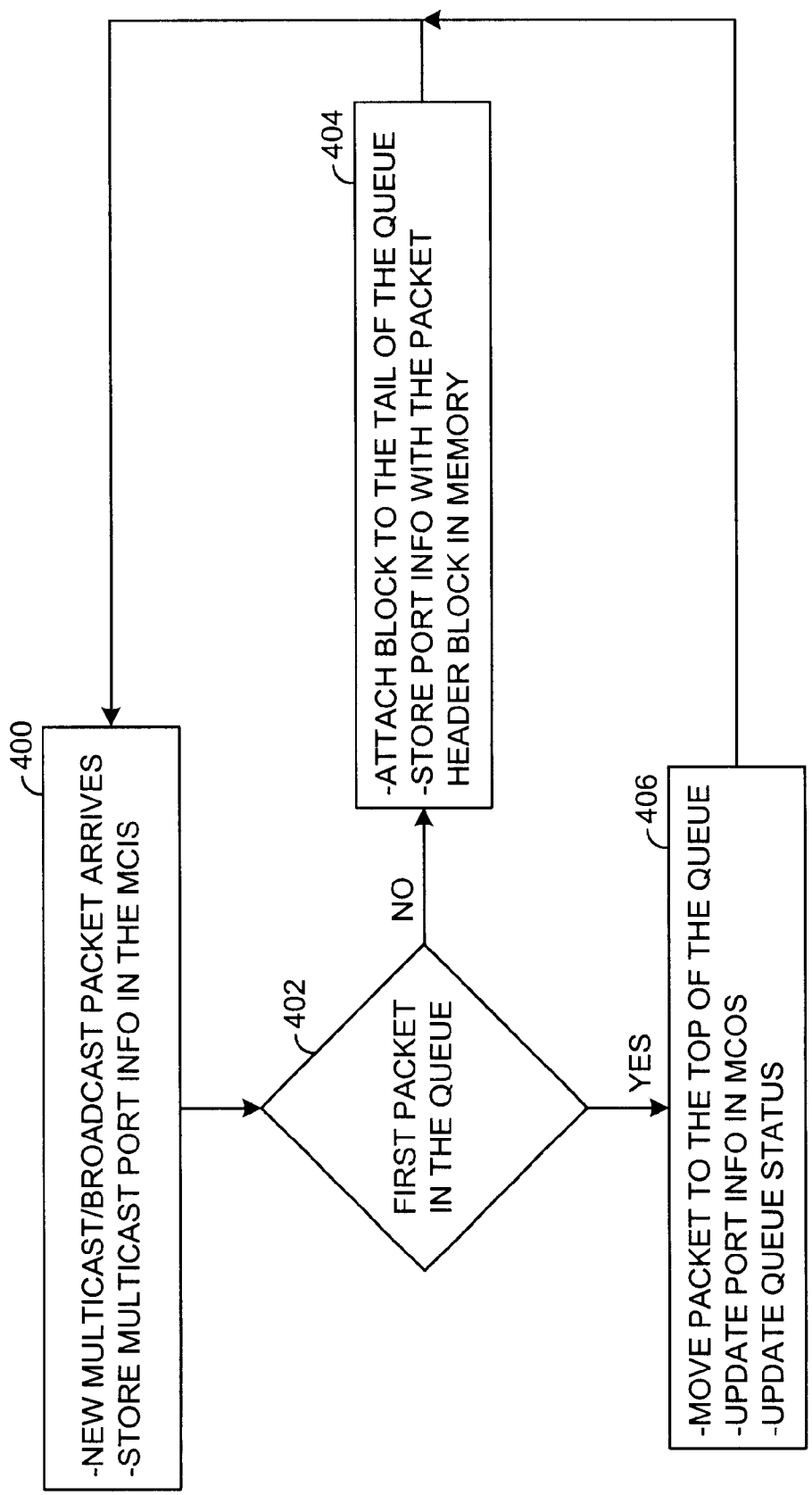
FIG. 8 is a flowchart illustrating the operation of the arrival of a multicast/broadcast packet in accordance with the present invention.

Referring to FIG. 8, a flowchart of a method illustrating an example of the flow of a multicast/broadcast arrival is shown. The method has a state 400 that is generally entered when a new multicast/broadcast packet arrives. The state 400 may store the multicast port information in the multicast input storage device 280 (of FIG. 5). Next, the method may enter a state 402, which may determine if the packet is the first packet in the particular queue. If the packet is not the first packet in the queue, the method may enter the state 404. In the state 404, the packet is attached to the tail of the appropriate multicast queue. The port information may be stored with the packet header block in the queue memory 238. Next, the method may return to the state 400. In the state 402, if the packet is the first packet in the queue, the flowchart may enter the state 406. In the state 406, the packet is generally moved to the top of the queue. The port information is generally updated in the multicast output storage device 302 and the queue status is generally updated. Next, the method returns to the state 400.

Figure 9:
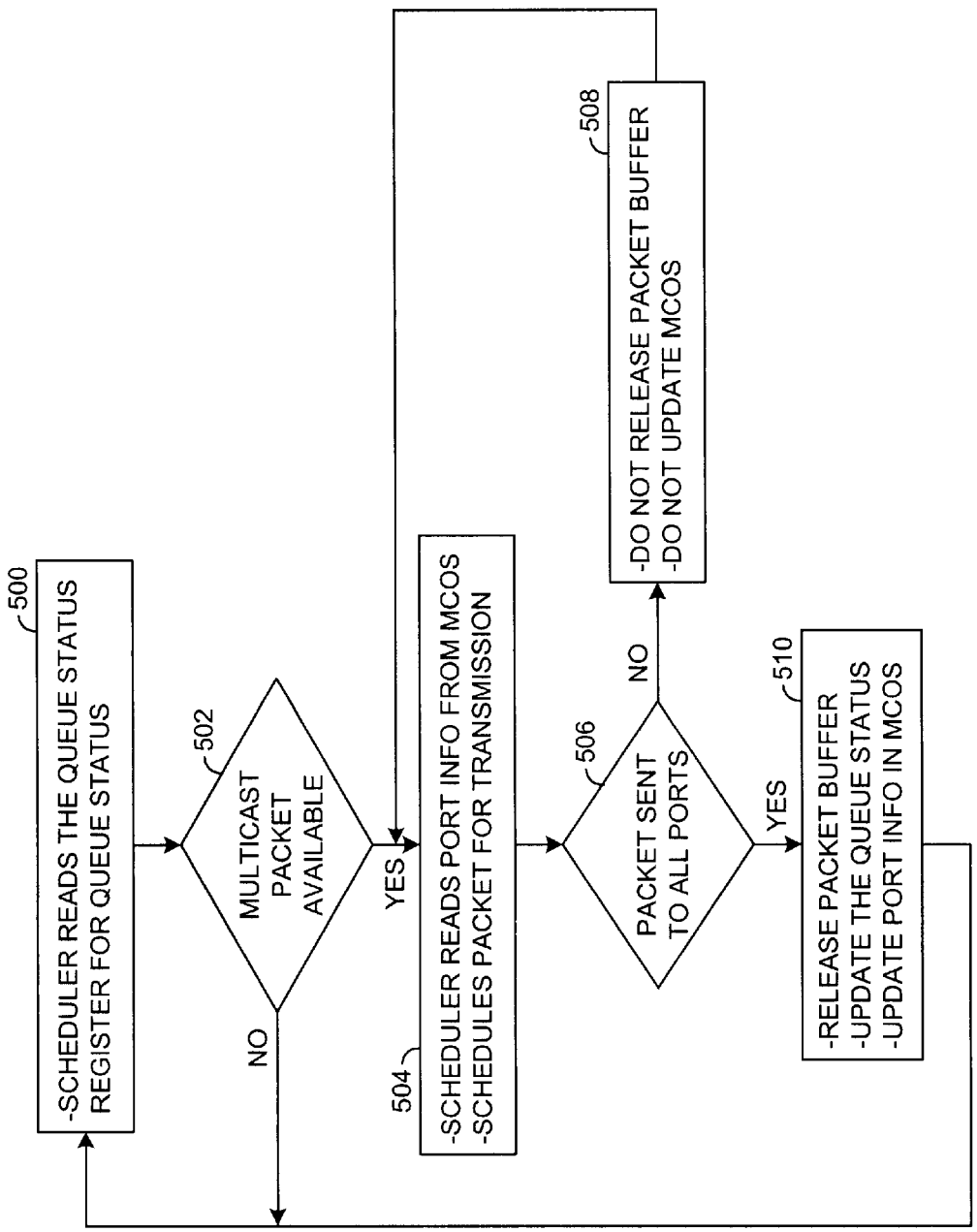
FIG. 9 is a flowchart illustrating the operation of the departure of a multicast/broadcast packet in accordance with the present invention.

Referring to FIG. 9, a flowchart of a method illustrating an example of the departure flow of a multicast/broadcast is shown. In a state 500, the scheduler generally reads the status of the queue from a queue status register in the queue manager 236. The queue status register may store the status of the particular queues. Next, the method enters a state 502, where the method checks to see if a multicast packet is available. If a multicast packet is not available, the method returns to the state 500. If the multicast packet is available, the method enters the state 504. In the state 504, the scheduler 218 (of FIGS. 3, 4, 5, etc.) generally reads port information from the multicast output storage device 302 and schedules a packet for transmission. Next, the method may enter the state 506. In the state 506, the method generally checks to see if the packet has been sent to all of the appropriate ports. If the packet has not been sent to all of the appropriate ports, the method generally enters the state 508. In the state 508, the packet is not released from the packet buffer and the multicast output storage device 302 is not generally updated. Next, the method returns to the state 504. In the state 506, if the packet has been sent to all of the appropriate ports, the method enters the state 510. In the state 510, a packet buffer in the queue memory 238 is released, the queue status is updated and the port information is updated in the multicast output storage device 302. Next, the method returns to the state 500. As a result, a broadcast/multicast operation may be implemented in the circuit 200.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a memory comprising a plurality of memory sections configured to hold one or more queues, said memory configured to (i) store one or more packets of information in said one or more queues and (ii) send said stored one or more packets of information to each of a plurality of predetermined ports in response to one or more control signals, wherein said memory holds said stored one or more packets until said stored one or more packets are sent to each of said plurality of predetermined ports; and
   a control circuit configured to generate said one or more control signals.

2. The circuit according to claim 1, wherein said plurality of predetermined ports comprises (i) all of a plurality of ports coupled to said circuit when said circuit is broadcasting and (ii) two or more of said plurality of ports coupled to said circuit when said circuit is multicasting.

3. The circuit according to claim 1, wherein said plurality of memory sections comprise a plurality of header sections configured to hold information about said one or more queues.

4. The circuit according to claim 1, wherein each of said memory sections comprises one or more memory elements.

5. The circuit according to claim 1, wherein said memory comprises a first-in first-out (FIFO) memory.

6. The circuit according to claim 1, wherein said memory comprises a random access memory (RAM) and a logic circuit.

7. The circuit according to claim 1, wherein said control circuit comprises a packet classifier and a scheduler configured to operate separately.

8. The circuit according to claim 7, wherein said memory comprises (i) a logic circuit, (ii) a manager circuit and (iii) a storage circuit.

9. The circuit according to claim 8, wherein said logic circuit further comprises:

an input storage element configured to store port information prior to (i) said port information being held in said memory or (ii) said port information being sent to an output storage element.

10. The circuit according to claim 8, wherein said logic circuit further comprises:

an output storage element configured to hold port information received from said memory.

11. The circuit according to claim 8, wherein said logic circuit further comprises an output logic circuit configured to hold said one or more queues.

12. The circuit according to claim 2, further comprising a status storage element configured to hold information about the status of said one or more queues.

13. The circuit according to claim 11, further comprising:

a flush logic circuit configured to clear the contents of said output logic circuit in response to one or more of said control signals presented by said scheduler.

14. The circuit according to claim 11, further comprising an interface configured to connect said scheduler to said output logic circuit and said manager circuit.

15. The circuit according to claim 8, wherein said logic circuit, said manager circuit, and said storage circuit are fabricated on a single integrated circuit.

16. The circuit according to claim 15, wherein said scheduler is implemented on the same integrated circuit with said logic circuit, said manager circuit and said storage circuit.

17. The circuit according to claim 15, wherein said scheduler is implemented on a different integrated circuit than said logic circuit, said manager circuit and said storage circuit.

18. The circuit according to claim 7, wherein said packet classifier is configured to provide information about each of said one or more packets.

19. The circuit according to claim 18, wherein a particular one of said one or more packets is provided to said memory prior to another particular one of said one or more packets in response to said information.

20. A circuit comprising:

means for (i) storing one or more packets of information in a plurality of memory sections configured to hold one or more queues and (ii) sending said stored one or more packets of information to each of a plurality of predetermined ports in response to one or more control signals, wherein said storing means holds said stored one or more packets until said one or more packets are sent to each of said predetermined ports; and means for generating said one or more control signals.

21. The circuit according to claim 1, wherein said memory is configured to hold a plurality of queues.

22. The circuit according to claim 20, wherein said means for storing one or more packets of information is configured to hold a plurality of queues.

* * * * *